(12) United States Patent
Brown, Jr. et al.

(10) Patent No.: US 10,645,118 B2
(45) Date of Patent: May 5, 2020

(54) VIRTUALIZED NETWORK HONEYPOTS

(71) Applicant: Amazon Technologies, Inc., Seattle, WA (US)

(72) Inventors: Dennis Naylor Brown, Jr., Seattle, WA (US); Volker Helmut Mosthaf, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/911,720

(22) Filed: Mar. 5, 2018

(65) Prior Publication Data

US 2018/0198822 A1 Jul. 12, 2018

Related U.S. Application Data

(63) Continuation of application No. 15/459,465, filed on Mar. 15, 2017, now Pat. No. 9,923,922, which is a continuation of application No. 14/560,613, filed on Dec. 4, 2014, now Pat. No. 9,602,536.

(51) Int. Cl.
*H04L 29/00* (2006.01)
*H04L 29/06* (2006.01)

(52) U.S. Cl.
CPC ........ *H04L 63/1491* (2013.01); *H04L 63/083* (2013.01); *G06F 2221/2111* (2013.01)

(58) Field of Classification Search
CPC ............... H04L 63/1491; H04L 63/083; H04L 63/0227; H04L 63/0263; H04L 63/20; H04L 63/1408; H04L 63/101; H04L 63/0209; H04L 63/1416; H04L 63/108; H04L 67/146; H04L 67/02; H04L 65/4069; H04L 63/0823; H04L 63/10; H04L 63/168; G06F 21/55; G06F 2221/2105; G06F 2221/2111; G06F 21/10; G06F 21/64

See application file for complete search history.

(56) References Cited

U.S. PATENT DOCUMENTS

| | | |
|---|---|---|
| 6,769,120 B1 * | 7/2004 | Rodriguez ........... G06Q 10/109 455/418 |
| 8,695,097 B1 | 4/2014 | Mathes et al. |
| 9,092,782 B1 | 7/2015 | Zaslavsky et al. |
| 9,350,748 B1 | 5/2016 | McClintock et al. |
| 9,553,886 B2 | 1/2017 | Touboul et al. |
| 9,602,536 B1 | 3/2017 | Brown et al. |

(Continued)

FOREIGN PATENT DOCUMENTS

WO 2006131124 A1 12/2006

OTHER PUBLICATIONS

U.S. Appl. No. 15/459,465, filed Mar. 15, 2017, Non-Final Office Action dated Jun. 15, 2017.

(Continued)

*Primary Examiner* — Don G Zhao
(74) *Attorney, Agent, or Firm* — Thomas | Horstemeyer, LLP

(57) ABSTRACT

Disclosed are various embodiments for virtualized network honeypots. Network traffic is received from a connecting device. It is determined whether the network traffic is authorized or unauthorized. The network traffic is selectively routed to a requested network service or to a honeypot server based at least in part on whether the network traffic is authorized or unauthorized.

20 Claims, 9 Drawing Sheets

(56) References Cited

U.S. PATENT DOCUMENTS

| | | | |
|---|---|---|---|
| 2002/0021791 A1* | 2/2002 | Heilmann | H04L 63/105 379/189 |
| 2005/0050353 A1 | 3/2005 | Thiele et al. | |
| 2006/0161982 A1* | 7/2006 | Chari | G06F 21/53 726/23 |
| 2007/0067841 A1 | 3/2007 | Yegneswaran et al. | |
| 2007/0271614 A1 | 11/2007 | Capalik | |
| 2008/0018927 A1 | 1/2008 | Martin et al. | |
| 2008/0104700 A1 | 5/2008 | Fagone et al. | |
| 2008/0172739 A1 | 7/2008 | Nakae et al. | |
| 2009/0007270 A1 | 1/2009 | Futoransky et al. | |
| 2009/0328213 A1* | 12/2009 | Blake | H04L 63/1441 726/23 |
| 2010/0067377 A1 | 3/2010 | Wang et al. | |
| 2011/0099620 A1* | 4/2011 | Stavrou | G06F 21/566 726/12 |
| 2011/0179487 A1 | 7/2011 | Lee | |
| 2013/0254885 A1 | 9/2013 | Devost | |
| 2014/0096229 A1* | 4/2014 | Burns | H04L 63/1491 726/15 |
| 2014/0201835 A1* | 7/2014 | Emigh | G06F 21/55 726/23 |
| 2014/0359708 A1 | 12/2014 | Schwartz | |
| 2015/0067848 A1 | 3/2015 | Baikalov | |
| 2015/0113600 A1* | 4/2015 | Dulkin | H04L 63/102 726/4 |
| 2015/0121529 A1* | 4/2015 | Quinlan | H04L 63/1491 726/23 |
| 2015/0128246 A1* | 5/2015 | Feghali | H04L 63/0209 726/13 |
| 2016/0005029 A1 | 1/2016 | Ivey et al. | |
| 2016/0156656 A1 | 6/2016 | Boggs et al. | |
| 2016/0156658 A1 | 6/2016 | Thomas et al. | |
| 2017/0134405 A1 | 5/2017 | Ahmadzadeh et al. | |
| 2017/0230384 A1 | 8/2017 | Touboul et al. | |

OTHER PUBLICATIONS

U.S. Appl. No. 15/459,465, filed Mar. 15, 2017, Response to Non-Final Office Action dated Jun. 15, 2017.

U.S. Appl. No. 15/459,465, filed Mar. 15, 2017, Notice of Allowance dated Nov. 8, 2017.

U.S. Appl. No. 14/623,241, filed Feb. 16, 2015, Notice of Appeal filed on Dec. 7, 2016.

U.S. Appl. No. 14/623,241, filed Feb. 16, 2015, Non-Final Office Action dated May 4, 2017.

U.S. Appl. No. 14/623,241, filed Feb. 16, 2015, Response to Non-Final Office Action dated May 4, 2017.

U.S. Appl. No. 14/623,241, filed Feb. 16, 2015, Final Office Action dated Oct. 31, 2017.

U.S. Appl. No. 14/623,241, filed Feb. 16, 2015, Notice of Appeal filed on Jan. 26, 2018.

U.S. Appl. No. 14/108,238 entitled "Countering Service Enumeration Through Imposter-Driven Response," filed Dec. 16, 2013.

U.S. Appl. No. 13/896,934 entitled "Request Processing in a Compromised Account," filed May 17, 2013.

U.S. Appl. No. 14/537,637 entitled "Breach Detection-Based Data Inflation," filed Nov. 10, 2014.

U.S. Appl. No. 14/108,222 entitled "Countering Service Enumeration Through Optimistic Response," filed Dec. 16, 2013, issued on May 24, 2016 to U.S. Pat. No. 9,350,748.

U.S. Appl. No. 14/560,613, filed Dec. 4, 2014, Notice of Allowance dated Nov. 9, 2016.

U.S. Appl. No. 14/560,613, filed Dec. 4, 2014, Response to Non-Final Office Action dated May 23, 2016.

U.S. Appl. No. 14/560,613, filed Dec. 4, 2014, Non-Final Office Action dated May 23, 2016.

U.S. Appl. No. 14/623,241, filed Feb. 16, 2015, Final Office Action dated Sep. 8, 2016.

U.S. Appl. No. 14/623,241, filed Feb. 16, 2015, Response to Non-Final Office Action dated Feb. 26, 2016.

U.S. Appl. No. 14/623,241, filed Feb. 16, 2015, Non-Final Office Action dated Feb. 26, 2016.

U.S. Appl. No. 15/252,198, filed Aug. 30, 2016, Non-Final Office Action dated Dec. 1, 2017.

U.S. Appl. No. 15/252,206, filed Aug. 30, 2016, Non-Final Office Action dated Oct. 12, 2018.

U.S. Appl. No. 14/623,241, filed Feb. 16, 2015, Notice of Allowance dated Oct. 17, 2019.

* cited by examiner

VIRTUALIZED NETWORK HONEYPOTS

CROSS-REFERENCE TO RELATED APPLICATIONS

This application is a continuation of, and claims priority to, co-pending U.S. Patent Application entitled "VIRTUALIZED NETWORK HONEYPOTS," filed on Mar. 15, 2017, and assigned application Ser. No. 15/459,465, which is a continuation of, and claims priority to, U.S. Patent Application entitled "VIRTUALIZED NETWORK HONEYPOTS," filed on Dec. 4, 2014, assigned application Ser. No. 14/560,613, issued on Mar. 21, 2017, and assigned U.S. Pat. No. 9,602,536, both of which are incorporated herein by reference in their entireties.

BACKGROUND

Organizational computer networks are constantly under attack by malicious users. While firewalling and intrusion detection systems may be employed to limit access by hackers, the approaches have limitations. For example, zero-day and private exploits may be used in some cases to gain access via public-facing production systems. Recently, severe vulnerabilities have surfaced in secure sockets layer (SSL), Bourne again shell (bash), and secure shell (SSH). Undoubtedly, vulnerabilities in production systems will continue to be discovered.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to virtualized network honeypots. Generally speaking, a honeypot in technology parlance is a system that has been configured to be attractive to malicious users. Network administrators deploy honeypots so that they will be exploited. When malicious users exploit a honeypot, their attention may be turned away from other, legitimate systems. Moreover, the behavior of the malicious user with respect to the honeypot may be recorded and analyzed, thereby allowing network administrators to gain information about the malicious user. Such information may be leveraged to pursue legal action against the malicious user and/or to configure systems in the network to protect against similar attacks. For example, the use of a particular unknown exploit against a service may be detected via the honeypot, and proactive action may be taken to guard against similar attacks directed to production services. However, manually deploying honeypots in a network can be a challenging, labor-intensive task.

Various embodiments of the present disclosure provide approaches that may be used to easily deploy numerous virtualized honeypots in an organizational network. In one embodiment, virtualized honeypots may be deployed to existing computing devices that are used as desktop workstations. Network traffic to and from these virtualized honeypots may be backhauled to honeypot servers, which may provide an attractive environment for malicious users. By locating virtualized honeypots on workstation hardware, honeypot endpoints may be distributed across numerous segments of the organizational network. This may increase the likelihood that a malicious user will target a honeypot.

In another embodiment, organizational servers that may be used in production are configured to selectively route network traffic either to a production service or to a honeypot server. For example, network traffic from non-whitelisted or blacklisted hosts may be forwarded to a honeypot server rather than being dropped. The honeypot server may be configured to mimic an expected function of the organizational server. As a non-limiting example, network traffic for a mail server coming from unapproved hosts may be forwarded to a honeypot mail server. This forwarding function may be performed, for example, in place of simply dropping the network traffic from the unapproved hosts.

Figure 1A:
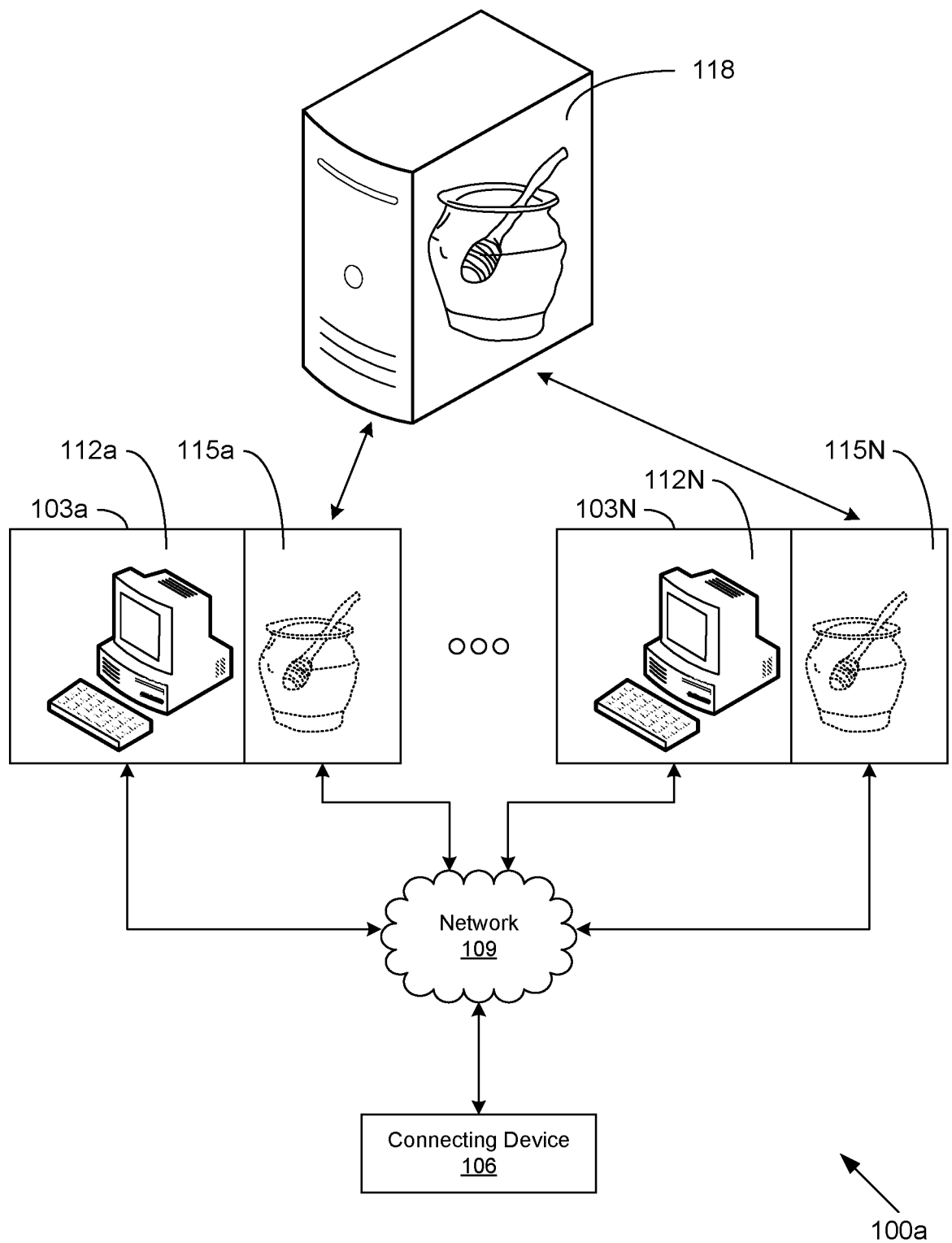
FIGS. 1A and 1B are drawings of example scenarios involving networked environments according to various embodiments of the present disclosure.

With reference to FIG. 1A, shown is a drawing of an example scenario involving a networked environment 100a according to a first embodiment. The networked environment 100a includes a plurality of client computing devices 103a . . . 103N in data communication with a connecting device 106 via a network 109. Each of the client computing devices 103a includes a respective primary host 112a . . . 112N and a respective secondary virtualized host 115a . . . 115N. The primary hosts 112 may correspond to workstations for legitimate users having permission and/or other clients in use by an organization. However, the secondary virtualized hosts 115 correspond to virtualized honeypots configured to attract the attention of non-legitimate and potentially malicious users.

The primary hosts 112 and the secondary virtualized hosts 115 each appear as distinct endpoints on the network 109. Nonetheless, the purpose of the secondary virtualized hosts 115 may be merely to route traffic to and from a honeypot server 118. Suppose a connecting device 106 initiates a port scan for hosts in a network address range. When the connecting device 106 attempts to connect to various ports upon the secondary virtualized hosts 115, the secondary virtualized hosts 115 are configured to backhaul or tunnel the network traffic to the honeypot server 118. The honeypot server 118 may be configured to mimic the behavior of a typical workstation, server, or any other legitimate computing device coupled to the network 109. However, the honeypot server 118 may be configured to monitor the behavior of non-legitimate users accessing resources of the honeypot server 118 via the connecting device 106 so that the non-legitimate users may be identified and/or future attacks may be profiled and stopped.

Figure 1B:
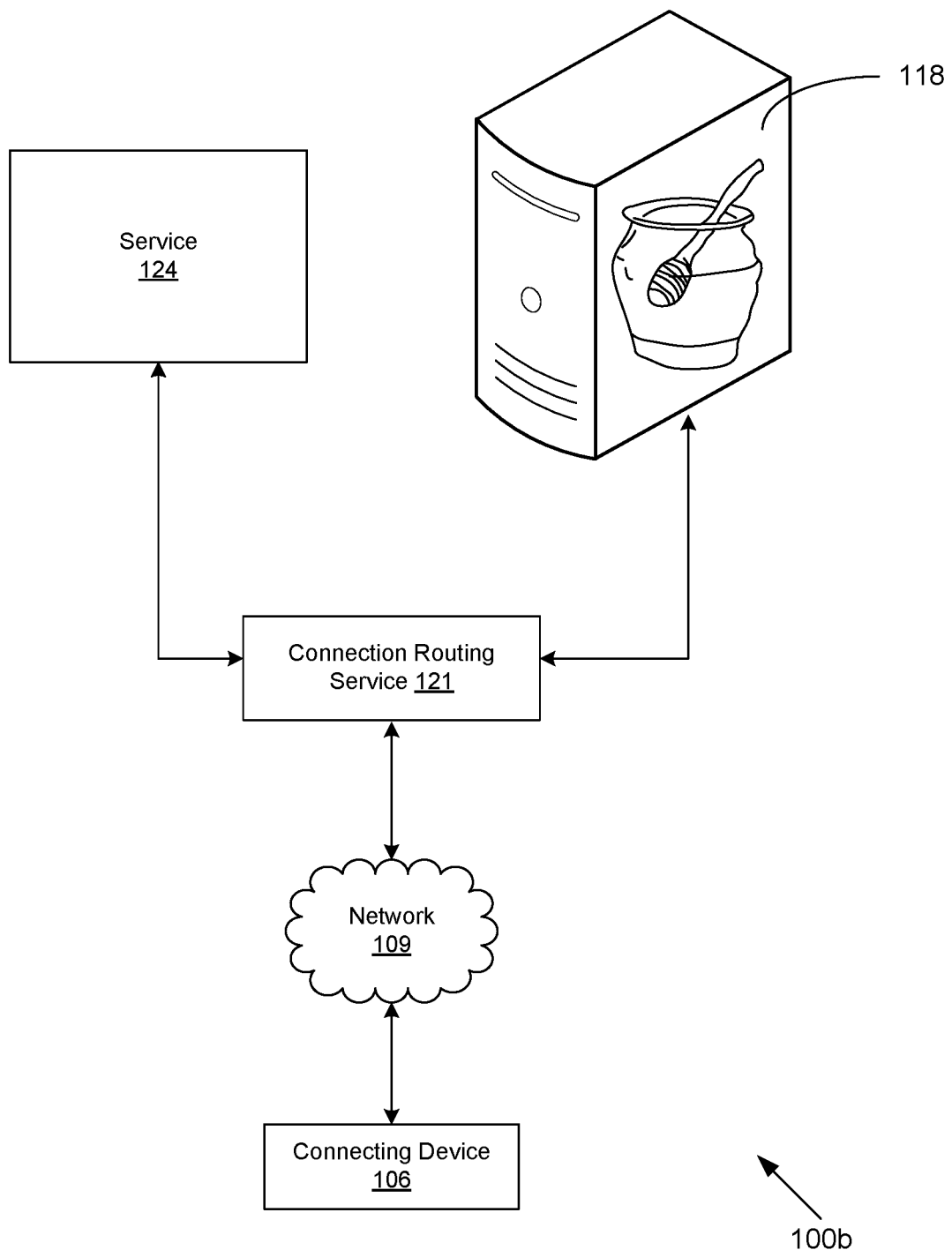

Turning now to FIG. 1B, shown is a drawing of an example scenario involving a networked environment 100b according to a second embodiment. The networked environment 100b includes a connecting device 106 in data communication with a connection routing service 121 via a network 109. The connection routing service 121 is configured to selectively route network traffic either to a requested service 124 or to a honeypot server 118. Suppose that the connecting device 106 opens a connection to a certain network address at a certain port, which would uniquely identify the service 124 on the network 109. The connection routing service 121 intercepts the connection and determines information about the connecting device 106. If the connecting device 106 is authorized to connect to the service 124, the connection routing service 121 routes the corresponding network traffic of the connecting device 106 to and from the service 124. However, if the connecting device 106 is not authorized to connect to the service 124, the connection routing service 121 instead routes the corresponding network traffic of the connecting device 106 to and from the honeypot server 118, which may be configured to masquerade as the service 124. A more detailed discussion of the components and operation of the networked environments 100a, 100b will next be provided.

Figure 2A:
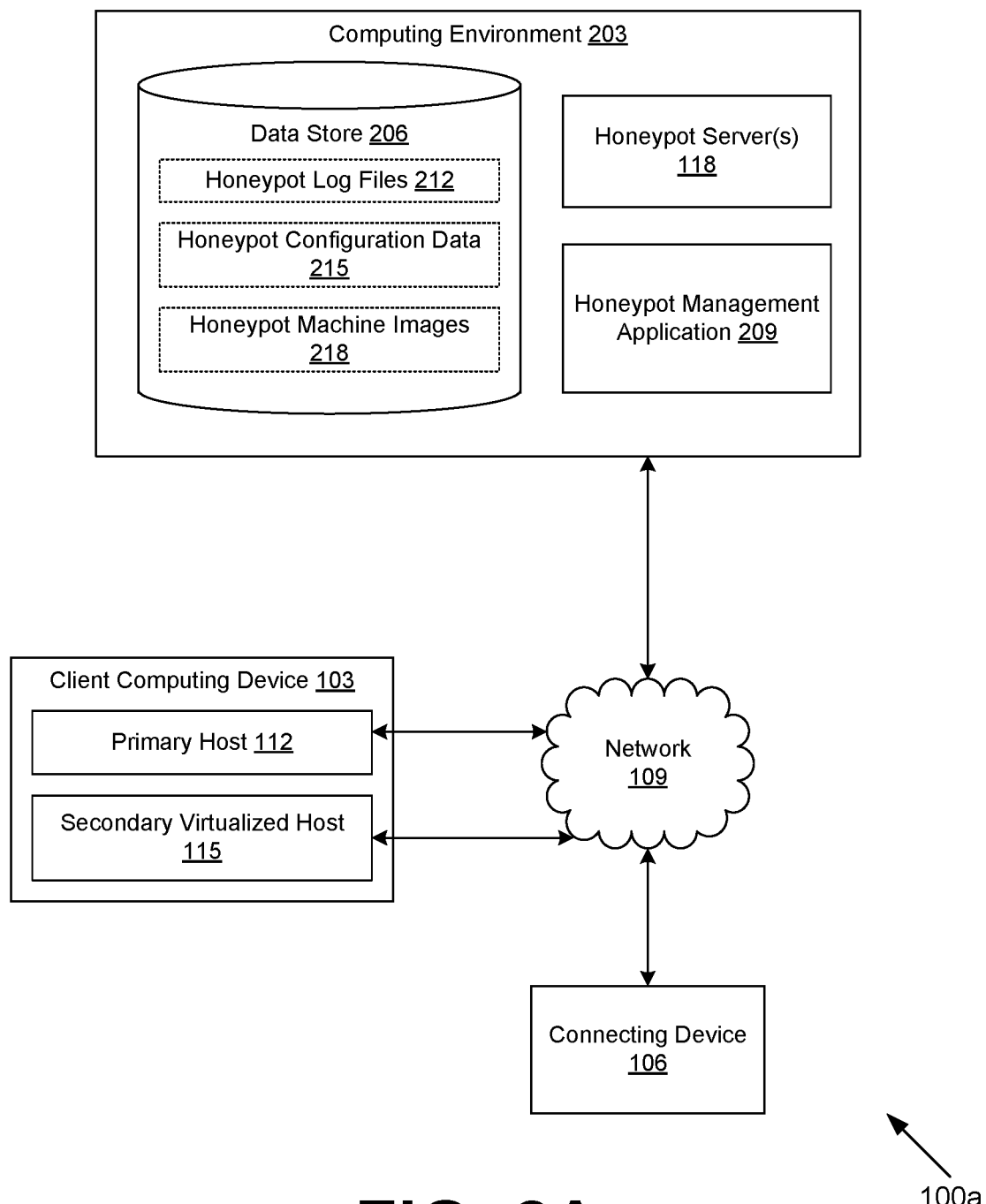
FIGS. 2A and 2B are schematic block diagrams of the networked environments of FIGS. 1A and 1B, respectively, according to various embodiments of the present disclosure.

Moving on to FIG. 2A, shown is an alternative schematic block diagram of the networked environment 100a according to the first embodiment. The networked environment 100a includes a computing environment 203, one or more client computing devices 103, and one or more connecting devices 106, which may be in data communication with each other via a network 109. The network 109 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted or "cloud" computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 206 that is accessible to the computing environment 203. The data store 206 may be representative of a plurality of data stores 206 as can be appreciated. The data stored in the data store 206, for example, is associated with the operation of the various applications and/or functional entities described below.

The components executed on the computing environment 203, for example, include one or more honeypot servers 118, a honeypot management application 209, and other applications, services, processes, systems, engines, or functionality not discussed in detail herein. The honeypot servers 118 are executed to provide a honeypot environment attractive for manipulation by non-legitimate users. The honeypot servers 118 may be configured to mimic characteristics of legitimate clients or servers of an organization. For example, the honeypot servers 118 may provide access to files that give the appearance that the honeypot servers 118 store personal information, financial information, and/or other potentially valuable information. The honeypot servers 118 may give the appearance that they serve an important role for the organization, e.g., a payment instrument processing server, an email server, a domain name server, and so on. Applications and data in the honeypot environment may be specifically configured to present this appearance. False network connections and/or application sessions may be generated relative to the honeypot server 118 to give the appearance that the honeypot server 118 is in production use.

Various honeypot features may make the honeypot servers 118 attractive to non-legitimate users. In some cases, the honeypot servers 118 may be equipped with software having known vulnerabilities. For example, software susceptible to popular exploits may be installed. Administrators may knowingly deploy honeypot servers 118 with an outdated operating system for which support and security fixes are unavailable. User accounts of the honeypot servers 118 may be configured with default usernames and passwords or other easily guessed security credentials. Firewalls and other security restrictions that are normally in place for organizational computing resources may be bypassed for the honeypot servers 118.

In addition to presenting an environment attractive to non-legitimate users, the honeypot servers 118 may be configured to monitor and contain user activity. For example, extensive logging functionality may be employed by the honeypot server 118 to chronicle all activity via the honeypot server 118. This logging functionality may be of a stealth nature, so as to avoid detection by the user. The honeypot server 118 may present a sandboxed environment, where any compromise cannot affect the network 109 and/or other organization devices coupled to the network 109. For example, network traffic to and from the honeypot server 118 may be limited so as not to overload the network 109. Also, the honeypot server 118 may be specially contained by way of firewalls, security rules, etc., in the honeypot server 118 and/or surrounding the honeypot server 118, to prevent users from gaining access to other organizational computing resources via the honeypot server 118.

Nonetheless, in some cases, multiple honeypot servers 118 may be deployed such that exploiting one honeypot server 118 may allow for exploitation of another honeypot server 118. For instance, a user may be able to access additional network segments through a compromised honeypot server 118, where the additional network segments are specially configured with more honeypot servers 118. This layering of access may give attackers confidence to generate more activity on the honeypot servers 118, thereby allowing for further monitoring of their actions.

The honeypot management application 209 is executed to facilitate management and deployment of the honeypot servers 118. In an embodiment where the honeypot servers 118 are executed in an elastic computing environment, the honeypot management application 209 may control launching and termination of machine instances corresponding to the honeypot servers 118. Further, the honeypot management application 209 may control mapping of the secondary virtualized hosts 115 to specific types of honeypot servers 118.

The data stored in the data store 206 includes, for example, honeypot log files 212, honeypot configuration data 215, honeypot machine images 218, and potentially other data. The honeypot log files 212 may record activity relative to the honeypot servers 118, including activity generated by non-legitimate users by way of connecting devices 106. The log records may include network addresses of the connecting devices 106, timestamps, event descriptions, keystroke data, files and/or other resources accessed, operations performed, and/or other information.

The honeypot configuration data 215 may control various aspects of the operation of the honeypot servers 118 and/or the honeypot management application 209. Such aspects may include, for example, number of secondary virtualized hosts 115 per honeypot server 118, types of honeypot servers 118, conditions under which honeypot servers 118 are instantiated, conditions under which honeypot servers 118 are terminated, authorized connecting devices 106 (i.e., whitelists), unauthorized connecting devices 106 (i.e., blacklists), and so on. The honeypot configuration data 215 may include rules and parameters to control these operational aspects.

The honeypot machine images 218 may correspond to machine images used for instantiating specific configurations of honeypot servers 118, e.g., in an elastic computing environment. Different honeypot machine images 218 may correspond to different operating systems, installed applications, file systems, and configuration parameters. Non-limiting examples of commercially available operating systems may include MICROSOFT WINDOWS XP, REDHAT LINUX, APPLE IOS, MICROSOFT WINDOWS VISTA, and so on. Different honeypot machine images 218 may correspond to different appearances of legitimate use within the organization, e.g., a mail server, a payment instruments server, a point-of-sale terminal, an automated teller machine, and/or other specific configurations.

The client computing device 103 is representative of a plurality of client devices that may be coupled to the network 109. The client computing device 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 103 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The client computing device 103 may include input devices such as, for example, touchscreens, accelerometers, microphones, keyboards, mice, buttons, etc. Although virtualized network honeypots are described with respect to client computing devices 103, it is understood that the principles of the present disclosure may be applied to enable virtualized network honeypots on server computing devices as well.

The client computing device 103 may include a primary host 112, a secondary virtualized host 115, and/or other hosts. The primary host 112 may be configured to provide workstation functionality for a legitimate user. To this end, the primary host 112 may be configured to execute various applications such as, for example, browsers, email applications, social networking applications, word processors, spreadsheets, game applications, and/or other applications. By contrast, the secondary virtualized host 115 may function purely as a separate endpoint on the network 109 that is configured to backhaul or tunnel its network traffic to one or more honeypot servers 118.

Resources of the primary host 112 may be entirely inaccessible via the secondary virtualized host 115. To connecting devices 106, the primary host 112 and the secondary virtualized host 115 may appear to be separate network devices on the same segment of the network 109. By deploying the secondary virtualized hosts 115 to the same client computing devices 103 as the primary hosts 112, virtualized network honeypots may be easily established throughout numerous segments of the network 109. Thus, if a connecting device 106 gains access to a deep or obscure segment of the network 109, virtualized network honeypots in the form of the secondary virtualized hosts 115 will still be present.

In some embodiments, the primary host 112 may be a virtualized computing environment under a hypervisor, and the secondary virtualized host 115 may be under the same hypervisor. In other embodiments, the secondary virtualized host 115 may correspond to a guest operating system that is operating within an operating system of the primary host 112. Non-limiting examples of commercially available virtualization platforms may include ORACLE VM VIRTUALBOX, VMWARE WORKSTATION, WINDOWS VIRTUAL PC, and others. In some embodiments, the primary host 112 and the secondary virtualized host 115 may correspond to different operating systems. For example, the primary host 112 may correspond to MICROSOFT WINDOWS 8.1, while the secondary virtualized host 115 may correspond to a minimalist LINUX distribution.

Figure 2B:
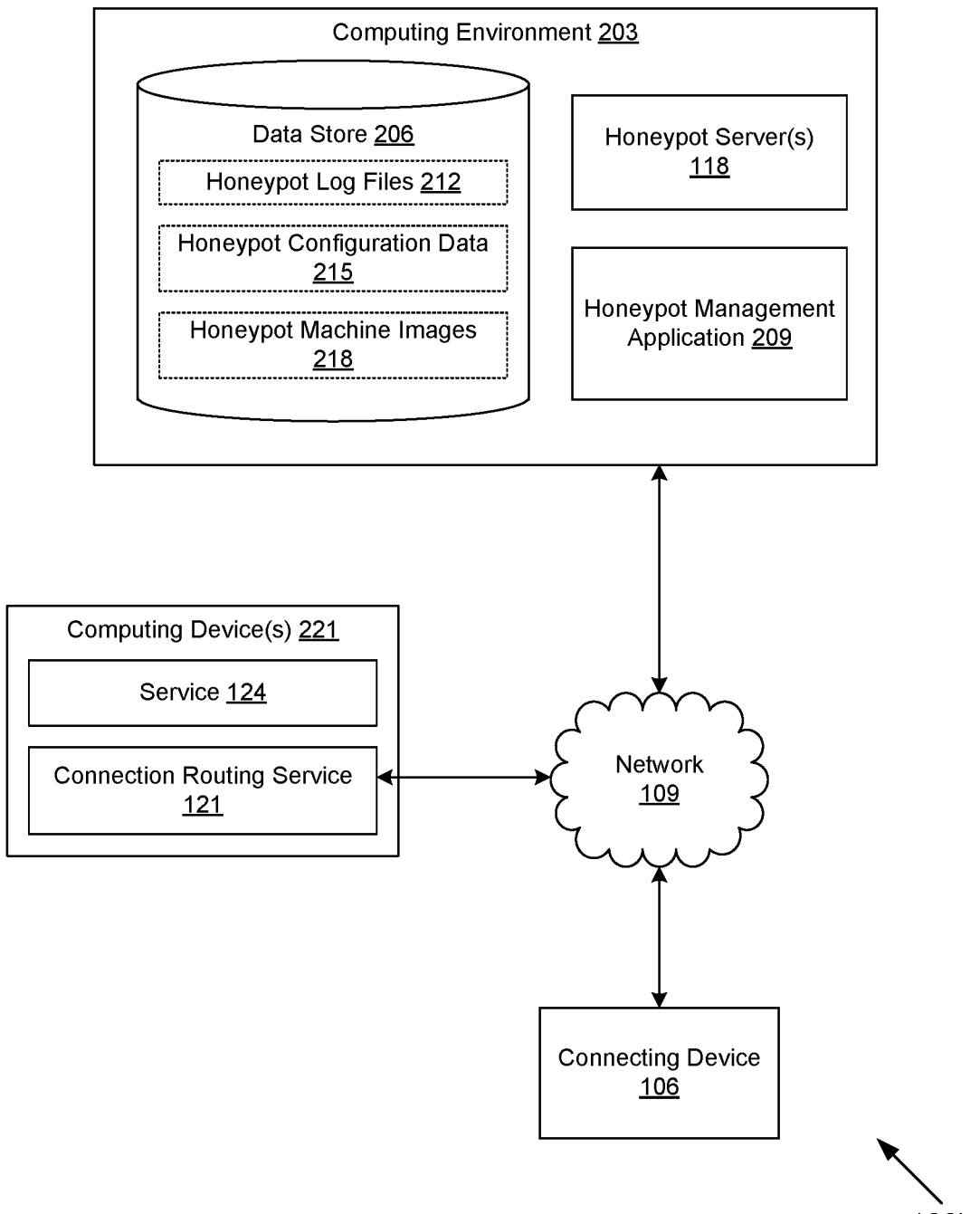

Continuing to FIG. 2B, shown is an alternative schematic block diagram of the networked environment 100b according to the second embodiment. The networked environment 100b includes a computing environment 203, one or more computing devices 221, and one or more connecting devices 106, which may be in data communication with each other via a network 109. As compared with FIG. 2A, the computing devices 221 are described in place of the client computing devices 103 (FIG. 2A).

The computing device 221 may comprise, for example, a server computer, a client computer, or any other system providing computing capability. Alternatively, the computing device 221 may employ a plurality of computing devices that may be arranged, for example, in one or more server banks, computer banks, or other arrangements. Such computing devices 221 may be located in a single installation or may be distributed among many different geographical locations. For example, the computing device 221 may include a plurality of computing devices that together may comprise a hosted or "cloud" computing resource, a grid computing resource, and/or any other distributed computing arrangement. In some cases, the computing device 221 may correspond to an elastic computing resource where the allotted capacity of processing, network, storage, or other computing-related resources may vary over time.

Various applications and/or other functionality may be executed in the computing device 221 according to various embodiments. For example, a service 124, a connection routing service 121, among other applications and functionality, may be executed in the computing device 221. The service 124 may correspond to any networked service, such as, for example, web servers, interactive login servers, file transfer protocol (FTP) servers, mail servers, domain name system servers, remote desktop servers, and others. The service 124 may listen to one or more transmission control protocol (TCP) ports or user datagram protocol (UDP) ports.

The connection routing service 121 is configured to intercept network traffic destined for the service 124, including network connection requests. To this end, the connection routing service 121 may be integrated into the networking stack of the computing device 221. Alternatively, the connection routing service 121 may be implemented in a different computing device 221 from the computing device 221 in which the service 124 is executed.

The connection routing service 121 is configured to selectively route network traffic and connection requests either to the service 124 or to a honeypot server 118. In this regard, the connection routing service 121 may examine characteristics of the connecting device 106 to make a determination as to whether the network traffic originating with the connecting device 106 should be directed either to the service 124 (i.e., corresponding to a legitimate use) or to the honeypot server 118 (i.e., corresponding to a non-legitimate use). For example, the connection routing service 121 may compare a network address of the connecting device 106 with whitelists, blacklists, etc., to determine whether the connecting device 106 is authorized. In one embodiment, such a blacklist may be updated by way of an intrusion detection system.

The routing/forwarding performed by the connection routing service 121 is transparent to the connecting device 106. Thus, it is indistinguishable to the connecting device 106 that the connection is routed either to the service 124 or to a honeypot server 118. The routing/forwarding may employ network address translation (NAT), port address translation (PAT), internet protocol (IP) masquerading, application-level proxying, and/or other technologies. The routing/forwarding may be similar to that performed by the secondary virtualized host 115 described in connection with FIG. 2A.

Figure 3:
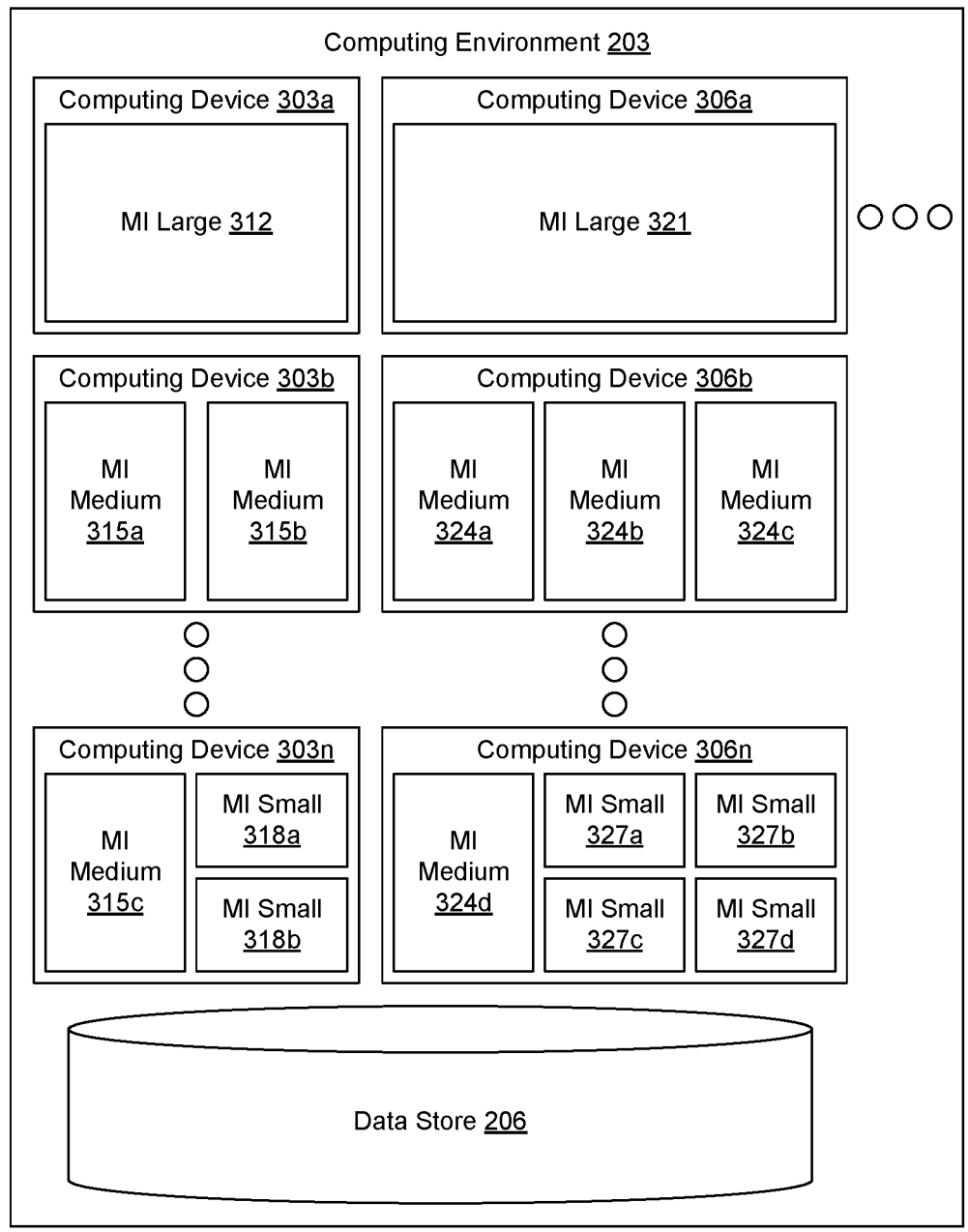
FIG. 3 is a drawing of one example of a computing environment in the networked environment of FIG. 2A or 2B according to various embodiments of the present disclosure providing an elastic computing environment.

Referring next to FIG. 3, shown is one example of a computing environment 203 according to various embodiments providing an elastic computing environment. The computing environment 203 includes a plurality of computing devices 303a, 303b . . . 303n, a plurality of computing devices 306a, 306b . . . 306n, and a data store 206. Such components of the computing environment 203 may be in data communication with each other and/or external computing devices by way of a network 109 (FIGS. 2A & 2B). Such computing devices 303 and 306 may be located in a single installation or may be dispersed among many different geographical locations.

The computing devices 303 and 306 may correspond to differing hardware platforms in various embodiments. Accordingly, the computing devices 303 and 306 may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. In one embodiment, all computing devices 303a, 303b . . . 303n may have a first hardware configuration, while all computing devices 306a, 306b . . . 306n may have a second hardware configuration.

For example, the computing devices 303 may have a certain ratio of a first type of resource to a second type of resource, while the computing devices 306 may have a different ratio of the first type of resource to the second type of resource. In a specific example, the computing devices 303 may have a relatively high amount of memory, while the computing devices 306 may have a relatively high amount of CPU resources. In another specific example, the computing devices 303 may have a relatively high amount of CPU resources, while the computing devices 306 may have a relatively high amount of GPU resources. Although only two sets of computing devices 303 and 306 are shown, it is understood that there may be any number of sets of computing devices 303 and 306 having different hardware configurations.

Each computing device 303, 306 may execute one or more machine instances (MI). A machine instance may correspond to an actual physical machine or to a virtual machine. A virtual machine instance is a virtualized computer system, or a software implementation of a physical computing system. Virtual machines may provide for multiple and/or different operating system environments to run concurrently on a single system having a processor circuit and a memory. As a non-limiting example, multiple instances of a LINUX operating system environment may execute concurrently with multiple instances of a MICROSOFT WINDOWS operating system environment on a single system. Each machine instance may be controlled by different customers, who may have administrative access only to their own instance(s) and no access to the instances of other customers. Multiple machine instances may in fact execute concurrently on a computer system including parallel processors, although multiple instances may appear to execute concurrently on a multithreaded computer system with fewer processors than instances.

Different types of machine instances may be available. In the example of FIG. 3, computing devices 303 may support three types of machine instances: MI large 312, MI medium 315, and MI small 318, each of which may be associated with differing resource configurations. As a non-limiting example, each MI large 312 instance may have four CPU-equivalent units, 15 GB of system memory, and 1,000 GB of data storage. Each MI medium 315 instance may have two CPU-equivalent units, 10 GB of system memory, and 600 GB of data storage. Also, each MI small 318 instance may have one CPU-equivalent unit, 5 GB of system memory, and 250 GB of data storage. In the example of FIG. 3, computing devices 306 may also support three types of machine instances, namely, MI large 321, MI medium 324, and MI small 327. MI large 321, MI medium 324, and MI small 327 may have the same respective configurations as MI large 312, MI medium 315, and MI small 318 or may have different configurations as desired. As a non-limiting example, a MI large 321 instance may have four CPU-equivalent units, 20 GB of system memory, and 1,000 GB of data storage. Certain types of machine instances may be more suited for executing certain honeypot servers 118 (FIGS. 2A & 2B) over others.

The example of three types of machine instances for each type of computing device 303, 306 is not intended to be limiting. In various embodiments, there may be more or fewer types of machine instances for each type of computing device 303, 306. In one embodiment, a machine instance may comprise an allocation of an entire computing device 303, 306 with no virtualization.

In the example of FIG. 3, one MI large 312 instance is executing on computing device 303a, two MI medium 315a, 315b instances are executing on computing device 303b, one MI medium 315c instance and two MI small 318a, 318b instances are executing on computing device 303n, one MI large 321 instance is executing on computing device 306a, three MI medium 324a, 324b, 324c instances are executing on computing device 306b, and one MI medium 324d instance and four MI small 327a, 327b, 327c, 327d instances are executing on computing device 306n.

In various embodiments, a system administrator and/or the honeypot management application 209 (FIGS. 2A & 2B) may be capable of launching new machine instances and/or terminating machine instances dynamically. Thus, the computing environment 203 may provide elastic computing capability to the customer that can vary over time.

Various applications and/or other functionality may be executed in the machine instances and in the computing devices 303, 306 according to various embodiments. Also, various data is stored in a data store 206 that is accessible to the computing devices 303, 306. This data may include honeypot machine images 218 (FIGS. 2A & 2B) that are used to instantiate MI large 312, MI medium 315, MI small 318, and/or other machine instances. Different types of machine instances may be employed depending on the nature of the honeypot to be presented. The machine instances may be coupled to the network 109 via a network virtualization layer such as an internet protocol (IP) virtualization layer that encapsulates IP traffic within IP traffic.

Figure 4:
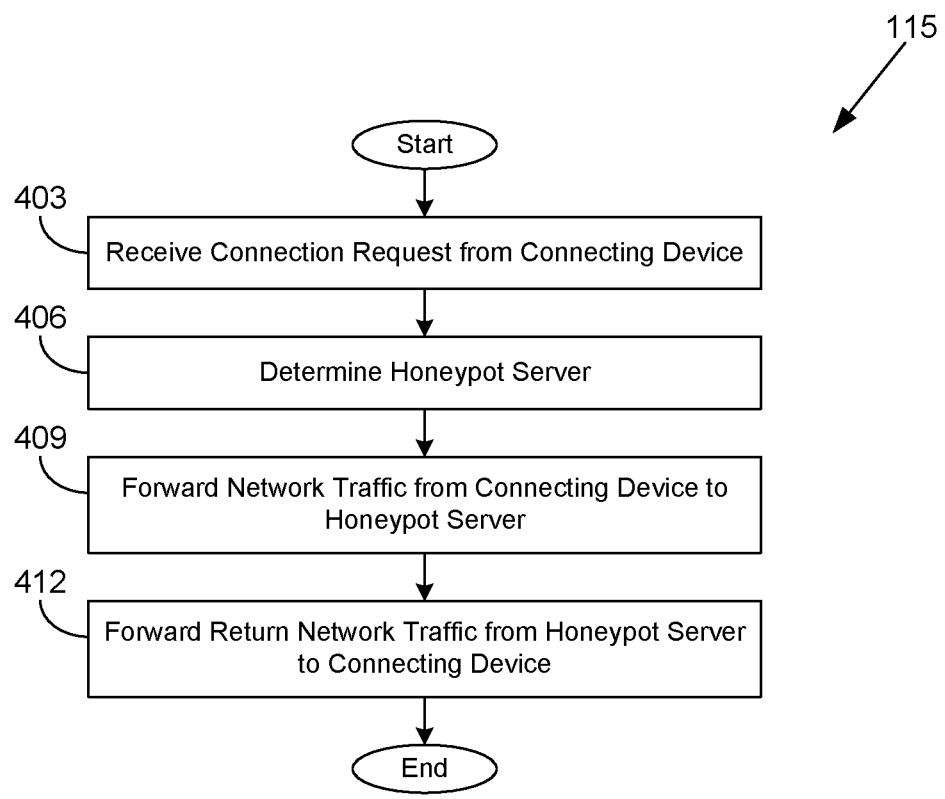
FIG. 4 is a flowchart illustrating one example of functionality implemented as portions of a secondary virtualized host executed in a client computing device in the networked environment of FIG. 2A according to various embodiments of the present disclosure.

Referring next to FIG. 4, shown is a flowchart that provides one example of the operation of a portion of the secondary virtualized host 115 according to various embodiments. It is understood that the flowchart of FIG. 4 provides merely an example of the many different types of functional arrangements that may be employed to implement the operation of the portion of the secondary virtualized host 115 as described herein. As an alternative, the flowchart of FIG. 4 may be viewed as depicting an example of elements of a method implemented in the client computing device 103 (FIG. 2A) according to one or more embodiments.

Beginning with box 403, the secondary virtualized host 115 receives a connection request from a connecting device 106 (FIG. 2A). This connection request may correspond to any type of network traffic, including TCP, UDP, IP, and/or other protocols. In some cases, the connection request may originate from a legitimate service in the organizational network, e.g., network security software that performs vulnerability scanning. However, in other cases, the connection request may correspond to activity by a non-legitimate and potentially malicious user. In some implementations, it may be assumed that the traffic is non-legitimate simply because it is directed at the network address of the secondary virtualized host 115.

In box 406, the secondary virtualized host 115 determines a honeypot server 118 (FIG. 2A) to which the network traffic is to be forwarded. In some cases, the honeypot server 118 may be statically configured for the secondary virtualized host 115. In other cases, the secondary virtualized host 115 may issue a dynamic lookup to the data store 206 (FIG. 2A) or to the honeypot management application 209 (FIG. 2A) to determine the appropriate honeypot server 118.

In determining the honeypot server 118, one of multiple honeypot servers 118 may be selected for purposes of load balancing or to ensure that only one non-legitimate user at a time is accessing any single honeypot server 118. It is noted that in some scenarios, multiple secondary virtualized hosts 115 may route network traffic to a single honeypot server 118. In some scenarios, a honeypot server 118 may be selected based at least in part on characteristics of the connecting device 106 and/or the connection request. For example, if a connecting device 106 is attempting to access a known WINDOWS-based service, a honeypot server 118 that executes WINDOWS may be selected. Alternatively, if a connecting device 106 is attempting to access a known LINUX-based service, a honeypot server 118 that executes LINUX may be selected. As another example, a particular honeypot server 118 may be selected based at least upon geolocation of a network address of the connecting device 106. In one embodiment, the honeypot server 118 may be dynamically instantiated from a honeypot machine image 218 (FIG. 2A) in an elastic computing environment by the honeypot management application 209 in response to the connection request.

In box 409, the secondary virtualized host 115 proceeds to forward network traffic from the connecting device 106 to the determined honeypot server 118. In box 412, the secondary virtualized host 115 similarly forwards return network traffic from the honeypot server 118 to the connecting device 106. Consequently, the secondary virtualized host 115 becomes a virtualized network honeypot, as the secondary virtualized host 115 appears the same as the honeypot server 118 to the connecting device 106. Thereafter, the operation of the portion of the secondary virtualized host 115 ends.

Figure 5:
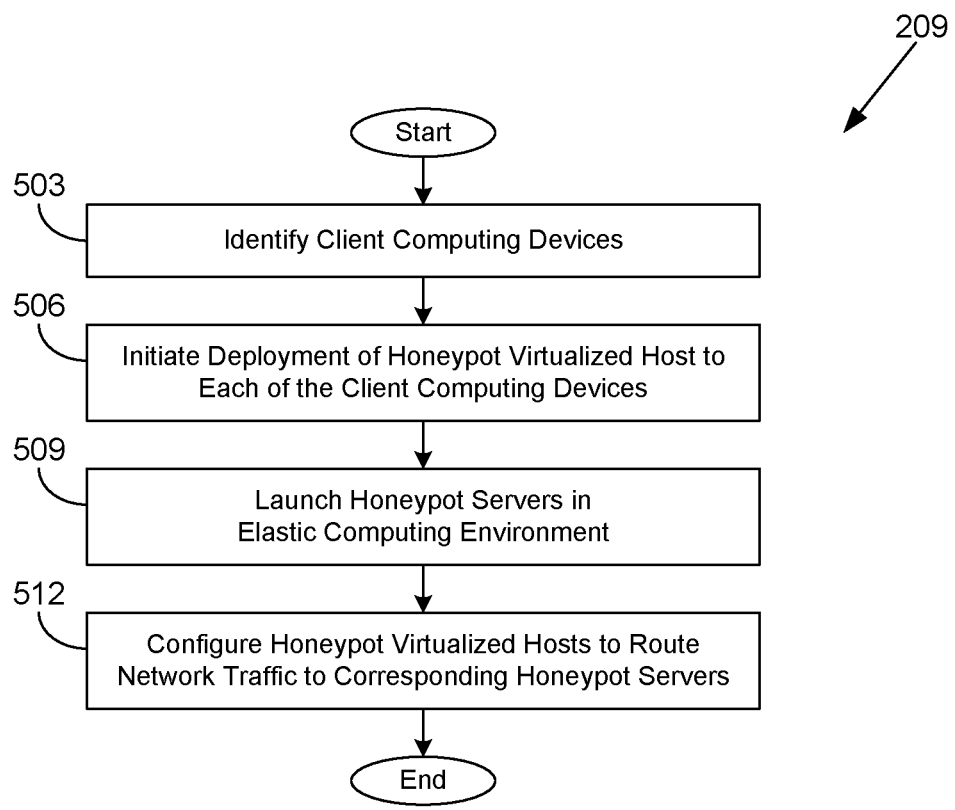
FIG. 5 is a flowchart illustrating one example of functionality implemented as portions of a honeypot management application executed in a computing environment in the networked environment of FIG. 2A according to various embodiments of the present disclosure.

Moving on to FIG. 5, shown is a flowchart that provides one example of the operation of a portion of the honeypot management application 209 according to various embodiments. It is understood that the flowchart of FIG. 5 provides merely an example of the many different types of functional arrangements that may be employed to implement the operation of the portion of the honeypot management application 209 as described herein. As an alternative, the flowchart of FIG. 5 may be viewed as depicting an example of elements of a method implemented in the computing environment 203 (FIG. 2A) according to one or more embodiments.

Beginning with box 503, the honeypot management application 209 identifies client computing devices 103 (FIG. 2A) of an organization that are coupled to a network 109 (FIG. 2A). The client computing devices 103 may be configured to have a primary host 112 (FIG. 2A) or primary operating system to provide workstation functionality for one or more legitimate users. In one embodiment, the client computing devices 103 may be configured with virtualization software to allow additional virtualized hosts to be installed upon the client computing devices 103. In box 506, the honeypot management application 209 initiates a deployment of a honeypot virtualized host (i.e., the secondary virtualized host 115 (FIG. 2A)) to each of the client computing devices 103. The honeypot virtualized host may utilize a guest operating system configured to coexist with the primary operating system. The honeypot virtualized host may be of a standard nature for each client computing device 103 platform. Diversity of honeypot characteristics, however, may be provided by the different honeypot machine images 218 (FIG. 2A) used to launch the honeypot servers 118 (FIG. 2A).

In box 509, the honeypot management application 209 launches one or more honeypot servers 118 (FIG. 2A) in an elastic computing environment. The honeypot management application 209 may select from among multiple different types of honeypot machine images 218 in instantiating the honeypot servers 118. In box 512, the honeypot management application 209 configures the honeypot virtualized hosts to route network traffic from connecting devices 106 to and from corresponding honeypot servers 118. In some cases, the honeypot management application 209 may determine to expand or reduce the numbers of honeypot servers 118 based at least in part on computing costs in the elastic computing environment, demand for the honeypot servers 118, frequency of attacks, and/or other factors. Thereafter, the operation of the portion of the honeypot management application 209 ends.

Figure 6:
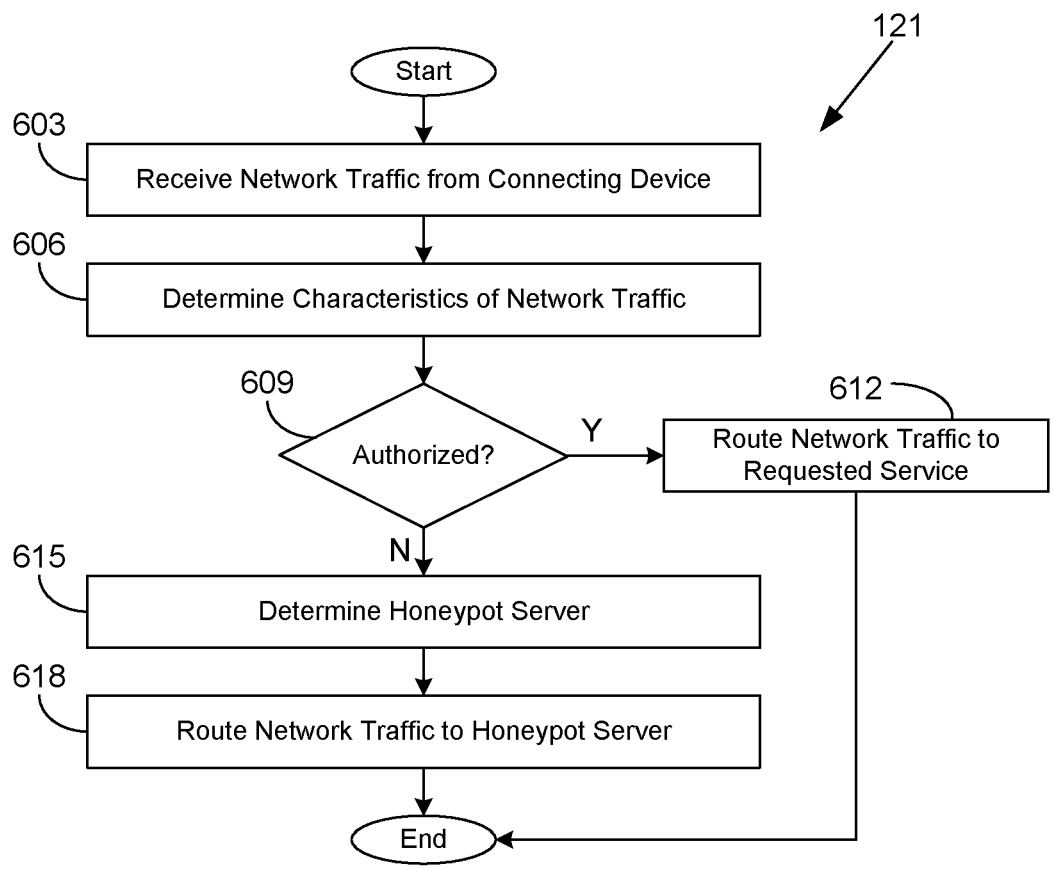
FIG. 6 is a flowchart illustrating one example of functionality implemented as portions of a connection routing service executed in a computing device in the networked environment of FIG. 2B according to various embodiments of the present disclosure.

Transitioning to FIG. 6, shown is a flowchart that provides one example of the operation of a portion of the connection routing service 121 according to various embodiments. It is understood that the flowchart of FIG. 6 provides merely an example of the many different types of functional arrangements that may be employed to implement the operation of the portion of the connection routing service 121 as described herein. As an alternative, the flowchart of FIG. 6 may be viewed as depicting an example of elements of a method implemented in the computing device 221 (FIG. 2B) according to one or more embodiments.

Beginning with box 603, the connection routing service 121 receives network traffic from a connecting device 106 (FIG. 2B). This may be an explicit connection request (as in a connection-oriented protocol such as TCP), or simply a first datagram (as in a connection-less protocol such as UDP). The connection request may include a destination network address, destination port, and/or other information. In box 606, the connection routing service 121 determines characteristics of the network traffic, which may include characteristics of the connecting device 106 and/or the requested connection. This may include source network address, source port, transport layer security (TLS) client certificates, volume of requests, time of day, if a given user is on vacation yet traffic is received from his or her workstation, and/or other information.

In box 609, the connection routing service 121 determines whether the network traffic is authorized to access a requested service 124 (FIG. 2B) corresponding to the connection request. For example, the connecting device 106 may utilize a whitelisted internal network address. If so, the connection routing service 121 may route/forward the network traffic from the connecting device 106 to the service 124. Thereafter, the operation of the portion of the connection routing service 121 ends.

If the connection routing service 121 instead determines that the network traffic is not authorized, the connection routing service 121 moves from box 609 to box 615. In some cases, network traffic from otherwise legitimate connecting devices 106 may be considered unauthorized if suspicious. For example, unexpectedly high service request rates and/or unexpected traffic may be considered suspicious. The connection routing service 121, in box 615, determines a honeypot server 118 (FIG. 2B). In some scenarios, the connection routing service 121 may instantiate the honeypot server 118 in an elastic computing environment. In box 618, the connection routing service 121 routes/forwards the network traffic from the connecting device 106 to the honeypot server 118 instead of the requested service 124. In some cases, the connection routing service 121 may send a notification to an administrator to inform the administrator of the honeypot access. Thereafter, the operation of the portion of the connection routing service 121 ends.

Figure 7:
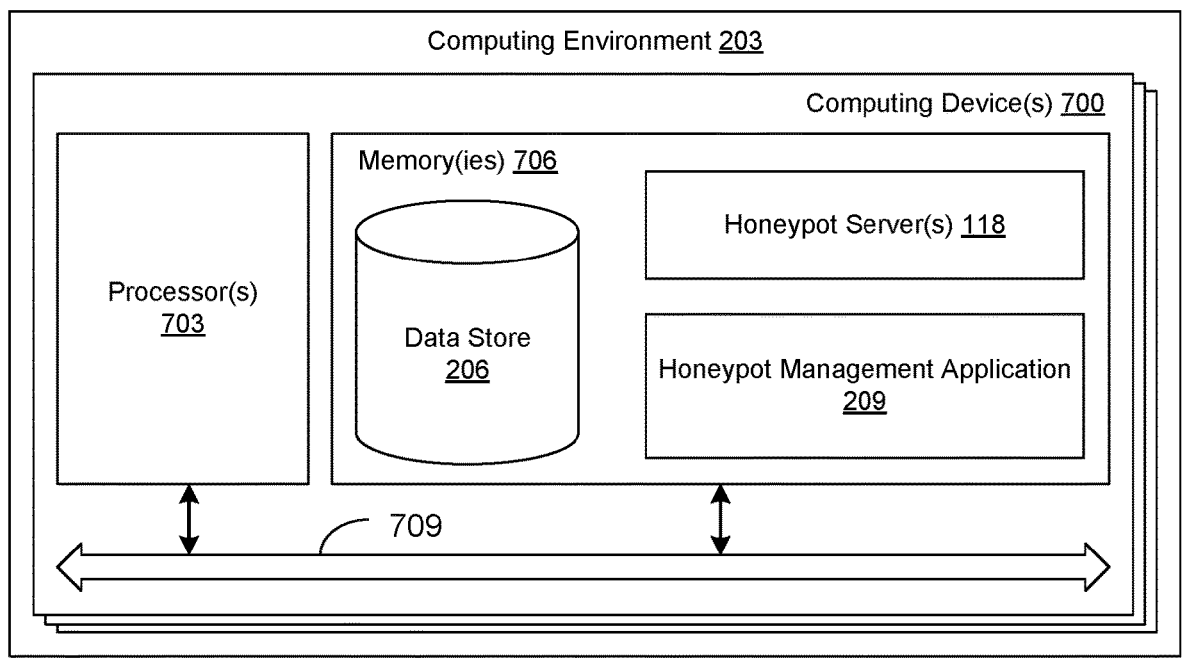
FIG. 7 is a schematic block diagram that provides one example illustration of a computing environment employed in the networked environment of FIGS. 2A and 2B according to various embodiments of the present disclosure.

With reference to FIG. 7, shown is a schematic block diagram of the computing environment 203 according to an embodiment of the present disclosure. The computing environment 203 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated. The client computing devices 103 (FIG. 2A) and the computing devices 221 (FIG. 2B) may be similarly implemented.

Stored in the memory 706 are both data and several components that are executable by the processor 703. In particular, stored in the memory 706 and executable by the processor 703 are the honeypot server(s) 118, the honeypot management application 209, and potentially other applications. Also stored in the memory 706 may be a data store 206 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the honeypot server(s) 118, the honeypot management application 209, the primary host 112 (FIG. 2A), the secondary virtualized host 115 (FIG. 2A), the service 124 (FIG. 2B), the connection routing service 121 (FIG. 2B), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the secondary virtualized host 115, the honeypot management application 209, and the connection routing service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the honeypot server(s) 118, the honeypot management application 209, the primary host 112, the secondary virtualized host 115, the service 124, and the connection routing service 121, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the honeypot server(s) 118, the honeypot management application 209, the primary host 112, the secondary virtualized host 115, the service 124, and the connection routing service 121, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
receiving, via at least one of one or more computing devices, network traffic from a connecting device;
determining, via at least one of the one or more computing devices, whether the network traffic is authorized; and
selectively routing, via at least one of the one or more computing devices, the network traffic to a requested network service or to a honeypot server based at least in part on whether the network traffic is authorized, wherein the network traffic is selectively routed by one of the one or more computing devices that also executes the requested network service, and the honeypot server is executed on a different computing device than the requested network service.

2. The method of claim 1, wherein the network traffic specifies a network address and a port corresponding to the requested network service.

3. The method of claim 1, further comprising sending, via at least one of the one or more computing devices, a notification to an administrator in response to selectively routing the network traffic to the honeypot server.

4. The method of claim 1, further comprising dynamically launching, via at least one of the one or more computing devices, a machine instance corresponding to the honeypot server in an elastic computing environment based at least in part on the network traffic.

5. The method of claim 4, further comprising dynamically terminating, via at least one of the one or more computing devices, the machine instance corresponding to the honeypot server.

6. The method of claim 1, wherein the honeypot server is configured to masquerade as the requested network service to the connecting device.

7. The method of claim 1, wherein determining, via at least one of the one or more computing devices, whether the network traffic is authorized further comprises determining, via at least one of the one or more computing devices, whether a network address of the connecting device is on a whitelist, wherein the network traffic is authorized when the network address is on the whitelist.

8. The method of claim 1, wherein determining, via at least one of the one or more computing devices, whether the network traffic is authorized further comprises determining, via at least one of the one or more computing devices, whether a network address of the connecting device is not on a blacklist, wherein the network traffic is authorized when the network address is not on the blacklist.

9. The method of claim 8, further comprising updating, via at least one of the one or more computing devices, the blacklist by an intrusion detection system.

10. A system, comprising:
a computing device;
a network service executable in the computing device; and
a connection routing service executable in the computing device, wherein when executed the connection routing service causes the computing device to at least:
receive network traffic from a connecting device, the network traffic specifying the network service as a destination;
determine whether the network traffic is authorized; and
selectively route the network traffic to the network service or to a honeypot server based at least in part on whether the network traffic is authorized, wherein the honeypot server is executed on a different computing device than the network service.

11. The system of claim 10, wherein when executed the connection routing service further causes the computing device to at least send a notification to an administrator in response to selectively routing the network traffic to the honeypot server.

12. The system of claim 10, wherein when executed the connection routing service further causes the computing device to at least dynamically launch a machine instance corresponding to the honeypot server in an elastic computing environment based at least in part on the network traffic.

13. The system of claim 10, wherein the honeypot server is configured to mimic an expected function of the network service.

14. The system of claim 10, wherein whether the network traffic is routed to the network service or to the honeypot server is indistinguishable to the connecting device.

15. The system of claim 10, wherein the connecting device corresponds to a workstation of a user, and the network traffic is determined to be unauthorized in response to determining that the user is on vacation.

16. The system of claim 10, wherein the network traffic is determined to be authorized based at least in part on at least one of: a time of day or a volume of connection requests received from the connecting device.

17. The system of claim 10, wherein the network traffic is determined to be authorized based at least in part on whether a transport layer security (TLS) client certificate is presented by the connecting device.

18. A non-transitory computer-readable medium embodying a program executable in at least one computing device, wherein when executed the program causes the at least one computing device to at least:
receive first network traffic from a first connecting device, the first network traffic specifying a network service as a destination;
determine that the first network traffic is authorized;
route the first network traffic to the network service, the network service being executed in a same computing device as the program;
receive second network traffic from a second connecting device, the second network traffic specifying the network service as the destination;
determine that the second network traffic is unauthorized; and
route the second network traffic to a honeypot server instead of the network service, the honeypot server being configured to masquerade as the network service to the second connecting device, wherein the honeypot server is executed on a different computing device than the network service.

19. The non-transitory computer-readable medium of claim 18, wherein when executed the program further causes the at least one computing device to at least dynamically launch a machine instance corresponding to the honeypot server in an elastic computing environment based at least in part on the second network traffic.

20. The non-transitory computer-readable medium of claim 18, wherein when executed the program further causes the at least one computing device to at least:
receive third network traffic from the first connecting device, the third network traffic specifying the network service as the destination;
determine that the third network traffic is unauthorized; and route the third network traffic to the honeypot server instead of the network service, the honeypot server being configured to masquerade as the network service to the first connecting device.

\* \* \* \* \*